United States Patent [19]

Grahame

[11] 4,345,298
[45] Aug. 17, 1982

[54] MODIFIED ROUND ROLL CAPACITOR AND METHOD OF MAKING

[75] Inventor: Frederick W. Grahame, Glens Falls, N.Y.

[73] Assignee: General Electric Company, Hudson Falls, N.Y.

[21] Appl. No.: 188,440

[22] Filed: Sep. 19, 1980

[51] Int. Cl.³ .......................................... H01G 1/017
[52] U.S. Cl. .................................. 361/273; 29/25.42; 361/315
[58] Field of Search ............... 361/273, 315, 301, 304, 361/314; 29/25.42

[56] References Cited

U.S. PATENT DOCUMENTS

| | | | |
|---|---|---|---|
| 774,115 | 11/1904 | Splitdorf | 361/301 |
| 2,058,846 | 10/1936 | Waterman | 29/25.42 |
| 3,112,356 | 11/1963 | Cohen | 361/314 X |
| 3,188,716 | 6/1965 | McGraw | 361/304 X |
| 3,812,407 | 5/1974 | Nose | 361/315 |
| 3,833,978 | 9/1974 | Eustance | 361/315 X |
| 4,170,665 | 10/1979 | Behn et al. | 361/315 X |

FOREIGN PATENT DOCUMENTS 882815 3/1960 United Kingdom ............... 361/273

*Primary Examiner*—Elliot A. Goldberg
*Attorney, Agent, or Firm*—James J. Lichiello; Gerhard K. Adam

[57] ABSTRACT

A modified round roll capacitor has a metallized paper electrode capacitor wound as a roll on a thick walled core tube with the roll and core tube being simultaneously flattened, the flattened core tube serving as an integral rigid core structure for the roll. The core is less deformable than the roll to provide continuing resistance in a flattening process and to maintain tension and central integrity to the structure.

14 Claims, 5 Drawing Figures

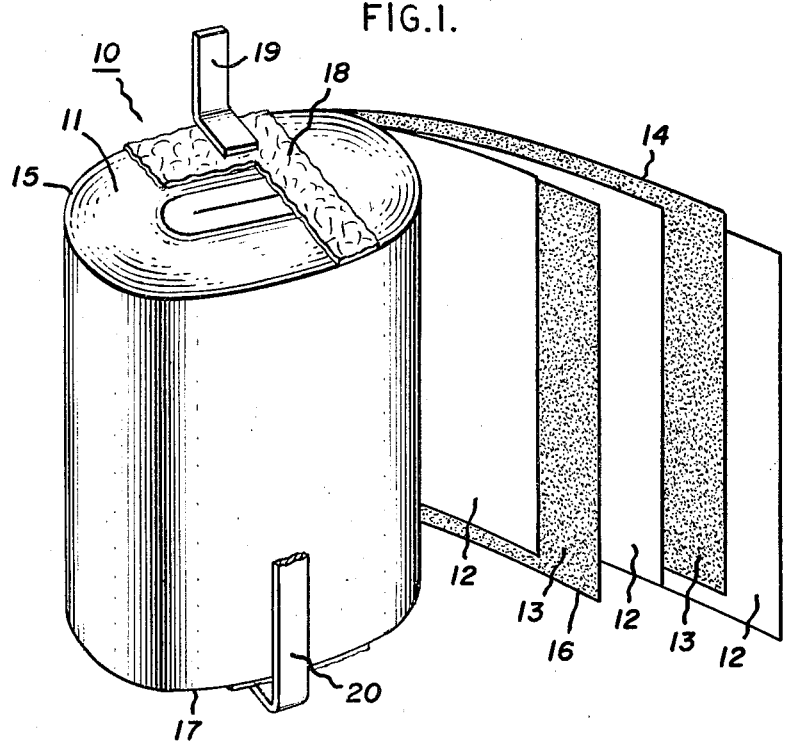
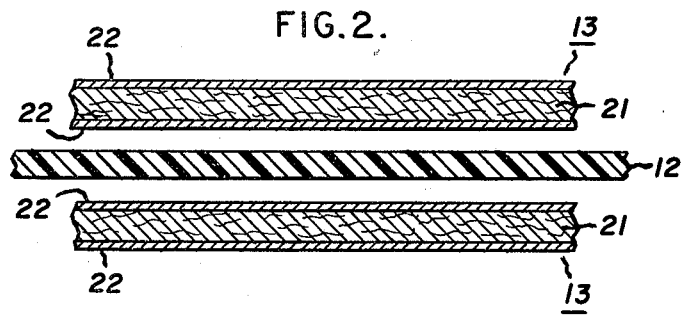
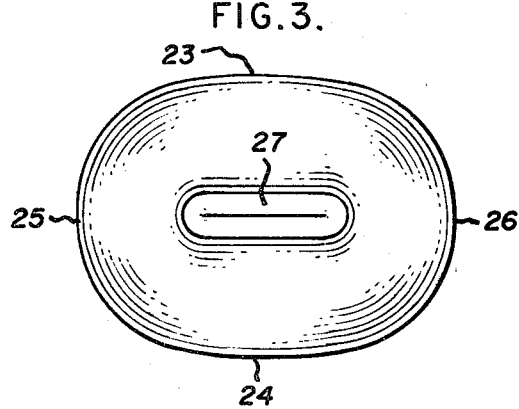

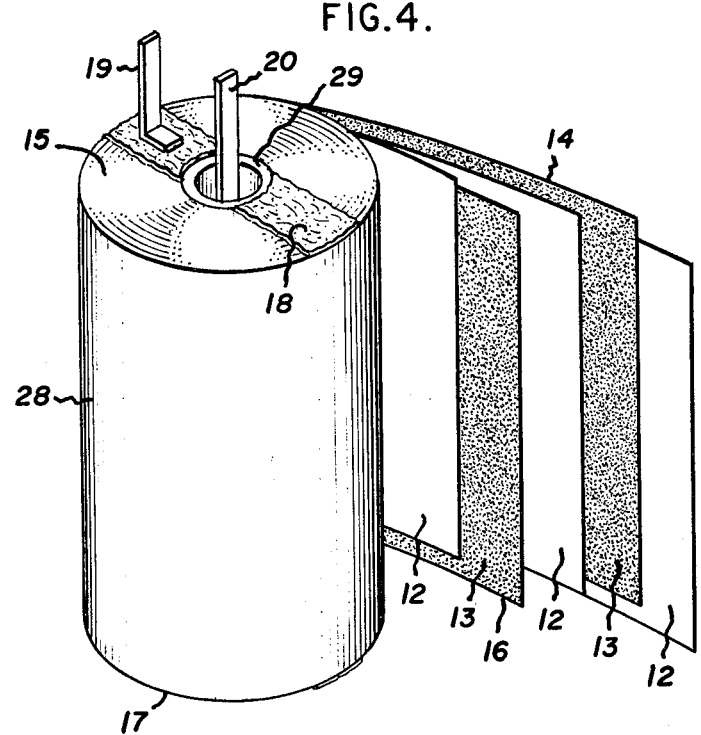
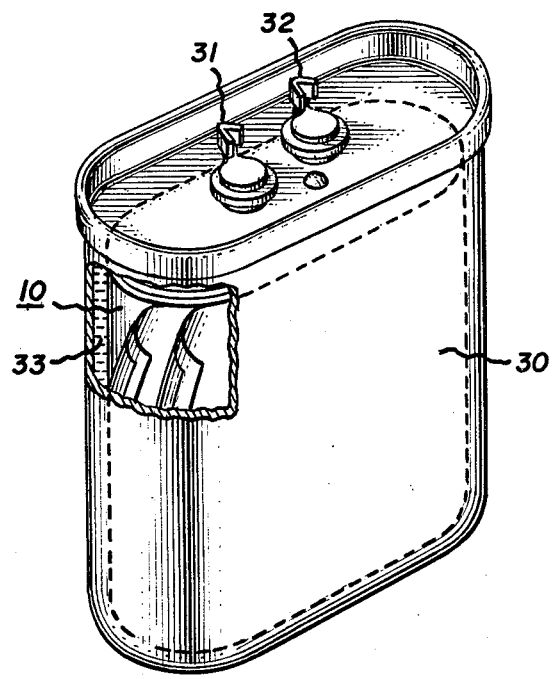

MODIFIED ROUND ROLL CAPACITOR AND METHOD OF MAKING

BACKGROUND OF THE INVENTION

In copending application Ser. No. 06/147,031, Grahame, there is described a number of fluid blends for certain capacitors defined as those capacitors having electrodes comprising paper strips which are metallized on both sides with a dielectric strip positioned between the electrodes. These capacitors, referred to as metallized paper capacitors were predominantly manufactured in a round roll, round casing form because certain parameters such as winding tension, space factor and roll integrity were deemed critical, and optimally obtainable only in the geometry of a round roll. Because of the criticality of the structure, great emphasis was placed on the kind of fluid to be used for impregnation because the characteristics of the fluid were required to be specifically correlated with the round structure.

In the noted copending application, it was discovered that such a capacitor could be greatly improved by the use of certain fluid blends of esters and hydrocarbons. Evidently the use of single chemical compounds and particularly blends of hydrocarbons and esters preserved the total optimum characteristics of the round roll construction while at the same time improving performance.

The prior art flattened or oval capacitor roll construction detracted from the integral rigid geometric round roll. The flattening process introduced wide variances in winding tensions and space factor and a general relaxation of stresses in the flattened areas. Fluid impregnants in these capacitors could not perform well because of the nonuniformity of the space factor, and limited swelling of the resin dielectric by the fluid left nonuniformly filled spaces in some parts of the roll. However, the flattened or oval roll construction is desirable for many reasons including its space saving considerations and its ability to thermally expand and contract more favorably.

SUMMARY OF THE INVENTION

It has been discovered that a modified round roll capacitor can be manufactured which will duplicate the desirable physical characteristics of the flattened or oval shape while at the same time retaining all the electrical and fluid impregnation characteristics of the round roll construction. Moreover, the new modified round roll permits the use, not only of a wider variation of impregnants without sacrifice of electrical characteristics, but also the use of more advantageous impregnants which are less limited by the criteria of the former round roll construction.

BRIEF DESCRIPTION OF THE DRAWINGS

This invention will be best described in connection with the following description and the drawings in which FIG. 1 is an illustration of a preferred embodiment of a modified round capacitor roll of this invention.

FIG. 2 is a cross-sectional view of spaced metallized paper strips and an intermediate synthetic resin strip which are wound into the roll of FIG. 1.

FIG. 3 is a cross-sectional illustration of the capacitor roll of FIG. 1.

FIG. 4 is an illustration of the capacitor roll of FIG. 1 before its modification.

FIG. 5 is an illustration of a complete modified round roll capacitor of this invention.

DESCRIPTION OF PREFERRED EMBODIMENTS

Referring now to FIG. 1, the exemplary capacitor roll section 10 comprises a core member 11 on which is a tightly wound series of synthetic resin strips 12 and metallized paper electrodes 13. The roll section 10 is wound with the electrodes in offset relationship to each other so that the metallized edges 14 of one electrode are exposed at one end 15 of the roll section and the exposed edges 16 of the other metallized electrode are exposed at the other end 17 of the roll section. A suitable metal such as aluminum or zinc is sprayed at each end of the roll section to form coatings 18, and electrode leads 19 and 20 are joined to coatings 18.

As illustrated more clearly in FIG. 2 the metallized paper electrodes 13 comprise a thin, high density paper strip 21 on which is a layer or coating 22 of aluminum. A number of materials may be employed for paper 13 including woven and nonwoven polymeric materials or other porous and wicking materials which will permit the ingress of dielectric fluids therein and therealong. However, in the practice of this invention, capacitor tissue is preferred which is about 1.0 density. Such tissue is commercially available as Kraft capacitor tissue.

The paper strips 21 are coated with a metal layer 22 on both sides thereof, a combination referred to as doubly metallized paper. Preferably the metal is aluminum or zinc which are vacuum deposited on the paper by well-known vacuum deposition to provide a uniform high purity metal layer. Such layers are measured in terms of their ohms resistance per square unit of area of electrode foil and a range for the present invention is from about 4.0 to about 7.0 ohms per square unit of area.

The synthetic resin strips 12 may be single or multiple strips of one or more of the more common dielectric resins such as the polyolefins, polycarbonates and polyamines, etc., and homopolymers and copolymers thereof. However, a resin comprising electrical capacitor grade polypropylene is a preferred resin strip for this invention. Capacitor grade polypropylene film is a higher purity, smoother polypropylene film of enhanced dielectric characteristics.

The particular shape of the modified round roll of this invention is more clearly illustrated in FIG. 3. Referring now to FIG. 3, there is shown a relatively thick roll section having relatively large opposed flat sides 23 and 24 and transversely thereof a pair of smaller sides 25 and 26. In a typical capacitor roll, the inner turns of the roll closer to the core structure 27 show a more flattened or straight sided configuration. As the number of turns increase the sides 25 and 26 became more arcuate. Alternately described, the roll 10 comprises a pair of inwardly facing arcuate sides 25 and 26 joined by opposing flat sides 23 and 24. The final shape of the core structure 27 is the same, i.e., the cross sectional geometries of the roll section and the core structure are near identical, as shown in FIG. 3. The shape and structure described is predetermined and fixed by the shape of the core structure 27 and the method of manufacture of the roll 10. For example, the composite as illustrated in FIG. 2 is wound in roll form on a thick deformable core or tube 29 (FIG. 4) on a high-speed automatic winding machine. In this process the core 29 remains a part of the capacitor roll as illustrated in FIG. 4 in a round roll design. Such a hard wound roll on a rigid core member is also described in U.S. Pat. No. 3,987,348, Flanagan.

Ordinarily an oval roll capacitor such as described in U.S. Pat. No. 4,117,579, Shaw, is wound directly on a machine arbor, removed from the arbor and flattened, no core member being necessary or desirable. Once a roll is flattened the inner turns of the roll are in a relaxed state and tend to wrinkle, thus deleteriously affecting space factor between turns. Also the tension in the roll ends decrease to change the space factor. These items tend to worsen during the life of the capacitor. Prior oval roll capacitors, other than the double metallized paper capacitors were not critical in this respect. However, double-metallized paper construction capacitor requires careful electrode and dielectric alignment and maintenance of uniform space factor throughout the roll. The uniform space factor relates to looseness and tightness of the roll, the original winding tension, and the final rigid structure. These factors are not found in prior oval rolls.

In the present invention a capacitor roll is made up with all the criteria of a round roll design such as the round roll 28 of FIG. 4. Roll 28 includes a rigid central core tube 29, which is of a predetermined compressibility. The roll 28 is then simply flattened to a modified round roll design which returns the essential characteristics of the round roll design.

The modified round roll 10 of this invention includes the most important concept of central integrity. Central integrity is defined by having the roll include a predeterminedly compressible, flattened or deformable core structure 27 within the finished roll. The space taken up by this flattened central integrity core structure 27 restricts or limits the flattening process so that the roll is more of a modified round roll than the usual flattened oval. Furthermore, the core structure 27 was less deformable than the capacitor roll so that it provides a continuing resistance to the flattening process and continuing support to the roll to maintain tension and central integrity to the structure.

The core structure 27 was, in one example originally a spiral wound paper tube of approximately 0.080 inch wall thickness and extending over the length of the roll 28. This tube is illustrated as core 29 of FIG. 4. The paper tube 29 serves as a mandrel or core member on which the roll 28 is wound on a winding machine. When the winding operation is finished, the roll 28 and core member 29 are removed from the machine as a unit placed in a press and flattened to the configuration shown in FIGS. 1 and 3 where the tube 29 becomes a precisely flattened core structure 27.

The core structure 27 need not be paper but can be made of any fibrous, plastic or other material which will easily deform to the illustrated position and be compatible with the capacitor environment. The final thickness of the core structure 27 or wall thickness of core 29 are easily determined by empirical relationships depending on the final design size of the roll across the major flats and the number of turns in the roll. Ordinarily, with a wound Kraft paper tube where the paper is typically about 0.003 inch to 0.026 inch to about 0.030 inch to 0.150 inch. Space factor of the roll is more preserved, particularly in the inner turns and across the major flats. Moreover, the core structure 27 becomes a variable compressible fluid filled structure to preserve the roll integrity. All of the space in the central part of the roll is essentially filled by the core structure 27 and there is no unfilled space. The core structure 27 is a solid core and the total roll is a solid structure.

In the flattening process, the complete inner periphery of the roll is supported because the core 29 is less compressible than the roll. More importantly, as the core 29 is being flattened, it exerts a powerful lateral force in the roll serving to maintain the winding tension in the roll end windings. At the end of the flattening process, the compressed core 26 comprises an easily impregnable structure which lends continuing central integrity to the roll. Sequential pressing of the roll indicates that the core structure continually adjusts to the changing volume without any buckling, probably because of its greater wall thickness.

The capacitor roll 10 is assembled as described, and inserted within a preformed casing 30 of FIG. 5. In FIG. 5 casing 30 includes a pair of terminals 31 and 32 to which leads 19 and 20 of FIG. 4 are attached. Also the casing 30 is filled with a suitable impregnating fluid 31 such as those disclosed and described in the noted copending Grahame invention. A typical practice of this invention is as follows.

EXAMPLE 1

A number of capacitors were made up following the construction of FIGS. 1–5 of this specification. The capacitors were rated 12 mfd, 530 VAC. Double metallized paper thickness was 0.36 mil. The dielectric strips were polypropylene of 0.394 mil thickness. The core tube was spiral wound paper and had a wall thickness of 0.100 inch. The capacitors were wound very tightly on the core tube, removed from the winding machine and placed in a hydraulic press to be flattened to the configuration of FIG. 3. Thereafter, the capacitor rolls were sealed in a casing and impregnated with a blend of 40% phenyl xylyl ethane and 60% di 2-ethyl hexyl phthalate ester. Typical electrical tests revealed a capacitance of 12.28 mfd and a percent power factor of 0.018.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patent of the United States is:

1. In an electrical capacitor comprising a pair of spaced strip electrodes and a synthetic resin strip dielectric therebetween to form a laminate which is wound in round roll form, flattened and placed in a casing and impregnated with a dielectric fluid, the improvement comprising
   (a) the said strip electrodes comprising capacitor tissue paper having both sides metallized with a thin layer of metal;
   (b) a central core structure in said roll;
   (c) said central core structure being less compressible than said roll and being a thick walled tube on which said roll was wound and flattened therewith, to provide a solid spacer in said roll essentially without any intervening space in the center of said roll.

2. The invention as recited in claim 1 wherein the cross section geometry of said central core structure and the cross section geometry of said roll are essentially similar.

3. The invention as recited in claim 1 wherein said central core structure, before flattening was a tube whose wall thickness is in the range of about 0.030 inch to about 0.150 inch.

4. The invention as recited in claim 1 wherein said core tube is a paper tube having a wall thickness in the range of about 0.030 inch to about 0.150 inch.

5. The invention as recited in claim 1 wherein said core tube is a synthetic resin.

6. The invention as recited in claim 1 wherein said fluid impregnant comprises a nearly spherical molecular single chemical compound as compared to the straight chain structure of common electrical grade mineral oil.

7. The invention as recited in claim 6 wherein said fluid comprises a synthetic hydrocarbon.

8. The invention as recited in claim 6 wherein said fluid comprises an ester.

9. The invention as recited in claim 6 wherein said fluid comprises a blend of a synthetic hydrocarbon and an ester.

10. The invention as recited in claim 9 wherein said hydrocarbon is taken from the class consisting essentially of the diaryl alkanes, alkyl biphenyls, alkyl napthalenes, and said esters are taken from the class consisting essentially of the phthalate esters.

11. The invention as recited in claim 9 wherein said hydrocarbon is phenyl xylyl ethane.

12. The invention as recited in claim 9 wherein said hydrocarbon comprises at least 50% by volume of the blend.

13. In a method of manufacturing a capacitor utilizing doubly metallized paper strips as electrodes and a synthetic resin therebetween as a dielectric, the improvement comprising
   (a) winding said strips in roll form on central thick walled core tube, said core tube being less compressible than said roll;
   (b) flattening said roll and said core tube so that the flattening of the tube supports the winding integrity of the roll;
   (c) impregnating said roll with a dielectric fluid.

14. An A.C. electrical capacitor comprising a pair of spaced strip electrodes of capacitor tissue paper metallized on both sides thereof, and a synthetic resin dielectric therebetween, said capacitor being in a modified round rolled form having opposed inwardly facing arcuate ends joined by opposed flat sides, and a flattened central integrity core structure therein having opposed inwardly facing arcuate ends joined by opposing flat sides said central core structure being less compressable than said roll, and a dielectric fluid impregnating said capacitor.

* * * * *